United States Patent Office 3,297,779
Patented Jan. 10, 1967

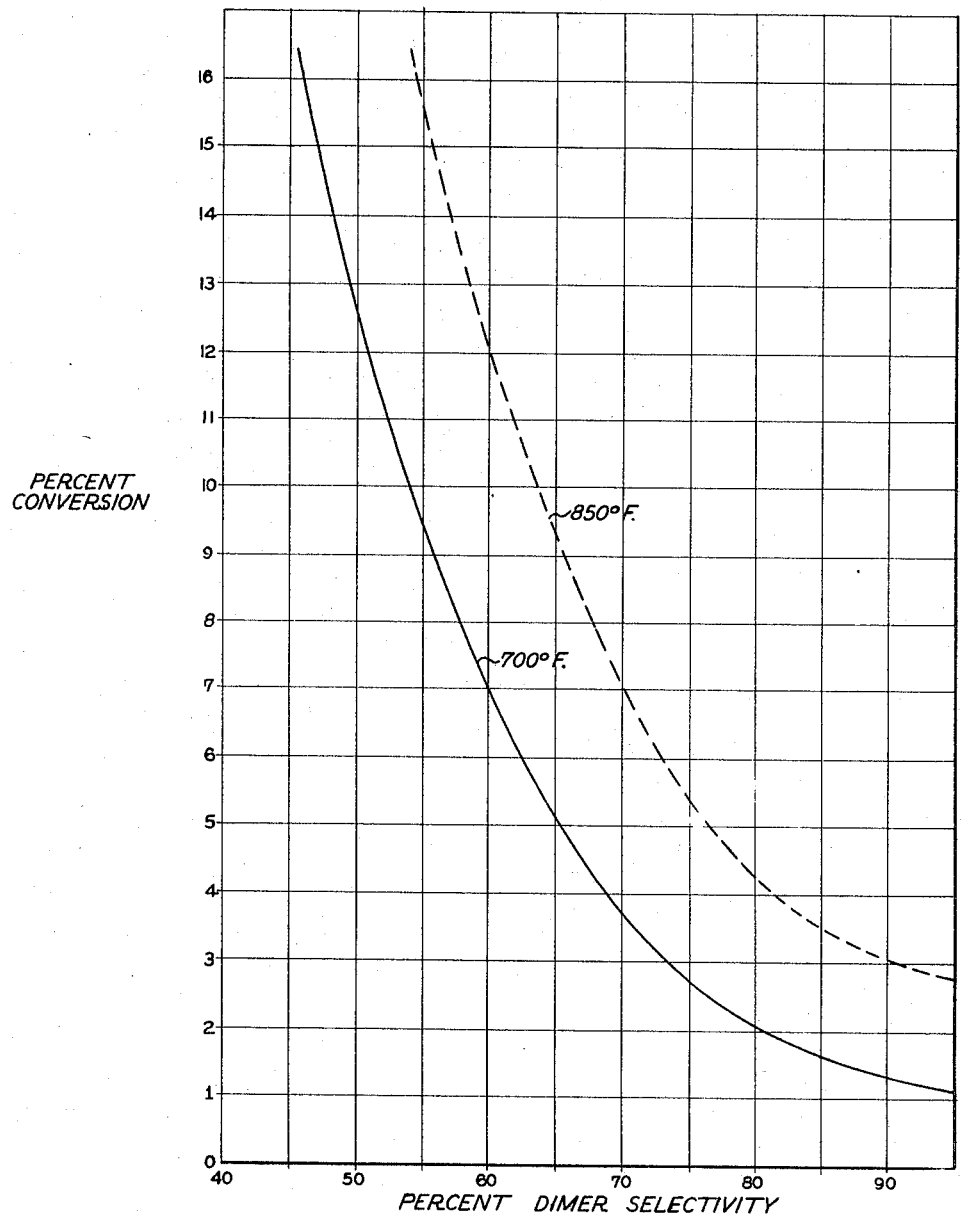
PROPYLENE VAPOR PHASE DIMERIZATION

3,297,779
PROPYLENE DIMERIZATION USING A SILICA-ALUMINA CATALYST
Rex E. Lidov, Great Neck, N.Y., assignor to Halcon International, Inc., a corporation of Delaware
Filed Mar. 29, 1963, Ser. No. 269,055
4 Claims. (Cl. 260—683.15)

This application is a continuation-in-part of copending application Serial No. 764,966, filed October 2, 1958, and now abandoned.

This invention is concerned with processes for the polymerization of propylene and catalyst therefor. More particularly, this invention is concerned with processes for dimerizing propylene to produce $C_6$ olefins. More specifically, this invention is concerned with selectively producing propylene dimer particularly at high temperatures and more particularly utilizing low conversions per pass of propylene.

It is known in the art to polymerize propylene using various catalysts to produce propylene dimer. Unfortunately, these methods produce a host of products such as trimer and tetramer and various cracked derivatives of these materials. The formation of these products results in low yields of dimer as the majority of propylene is trimer, tetramer or higher polymer.

Despite the fact that use of higher temperatures would be expected to result in higher proportions of cracked products, it has been found that in the polymerization of propylene use of high temperature reactions enables advantageous formation of dimer. Unfortunately, the catalysts known in the prior art when utilized at high temperatures result in degradation of the propylene polymer and consequently low yields of dimer are obtained.

It is a feature of the present invention to produce $C_6$ mono-olefins from propylene in high yield based on propylene consumed.

It is another feature of this invention to produce these $C_6$ olefins more economically than processes heretofore known since the formation of byproducts or cracked materials is minimized as a result of the highly selective dimerization step and expensive and frequently difficult separations are avoided.

It is another feature of the present invention to achieve high temperature reactions with a minimum of polymer degradation by utilizing weakly acidic zeolitic type catalysts.

It is still another feature of the present invention to minimize the formation of undesirable polymeric or cracked materials. This results inter alia in a reduction in costly maintenance problems since the need to shut down equipment for cleaning and removing of polymer is eliminated.

A feature of the present invention is a process comprising contacting propylene at a temperature above about 550° F. and desirably in the range of from approximately 550 to 1000° F. at superatmospheric pressure with a weakly acidic zeolitic type catalyst, desirably "treated" silica-alumina, at an hourly space velocity in the range of from approximately 550 to 3300 to selectively produce propylene dimer.

A further feature of the present invention resides in the fact that the weakly acidic zeolitic type catalyst of the present invention can be regenerated by, for example, passing air or molecular oxygen containing gas over said catalyst, desirably in situ, to remove coke and other deposits.

In a preferred embodiment of the invention the treated catalyst is obtained by contacting a silica-alumina catalyst with a basic aqueous solution, such as sodium carbonate, and washing the contacted catalyst until the washings are neutral.

As used herein, the term "treated catalyst" means a catalyst which has been contacted with a basic aqueous solution and washed until the washings are neutral.

It has been found that the conversion of propylene to dimer for fixed amounts of catalyst charge is affected by the flow rate of propylene feed. At higher flow rates lower conversions are obtained. It has been further found that the selectivity of propylene to dimer increases as the conversion of propylene per pass decreases.

As used in the specification, the terms "parts" and "percent" means parts by weight and percent by weight. The term "hourly space velocity" means volumes of propylene/volume of catalyst/hour, in which volumes are measured at standard temperature and pressure. The term "selectivity" means mols of propylene converted to dimer per 100 mols propylene consumed. The term "zeolitic" is used to embrace both the natural and synthetic acidic materials, particularly clays, exhibiting ion exchange characteristics.

In order to facilitate a clear understanding of the invention, the following preferred specific embodiments are described in detail.

*Example 1*

Silica-alumina catalyst granules are contacted with a 10% sodium carbonate solution and thoroughly washed with water until the washings are neutral. 100 parts of the thus treated catalyst are charged to a flow reactor equipped with heating means. There is added 930 parts of propylene per hour and the temperature is maintained at approximately 850° F. The pressure is maintained at 50 p.s.i.g. After reaction there is obtained a 3.5% conversion of the propylene with 95% selectivity to dimer.

*Example 2*

Example 1 is repeated except that the amount of propylene added to the reactor is 260 parts per hour. There is obtained a 16% conversion of the propylene with 61% selectivity to dimer.

*Example 3*

Example 1 is repeated except that the amount of propylene added to the reactor is 600 parts per hour. There is obtained a 6% conversion of the propylene with 72% selectivity to dimer.

*Example 4*

Example 1 is repeated except that 430 parts per hour of propylene are added to the reactor. There is obtained an 8% conversion of the propylene with 65% selectivity to dimer.

*Example 5*

Example 1 is repeated except that 3900 parts per hour of propylene are added to the reactor and the temperature is maintained at 700° F. There is obtained a 6% conversion of propylene with 65% selectivity to dimer.

By comparing Examples 5 and 3, it is apparent that decreasing the temperature from 850 to 700° F. decreases the selectivity since in both examples a 6% conversion is obtained, but at the lower temperature of Example 5 the selectivity to dimer is 65% compared to 72% selectivity in Example 3.

*Example 6*

Example 1 is repeated except that 84 parts per hour of propylene are added to the reactor and the pressure is decreased to 15 p.s.i.g. There is obtained a 15% conversion of propylene with a 57% selectivity to dimer.

*Example 7*

Example 1 is repeated except that 330 parts per hour of propylene are added to the reactor and the pressure is raised to 75 p.s.i.g. There is obtained a 16% conversion of propylene with a 60% selectivity to dimer.

*Example 8*

Example 1 is repeated except that the silica-alumina catalyst is not treated with sodium carbonate. The reaction products are found to contain a host of cracked materials (particularly $C_5$ and $C_4$ hydrocarbons) with substantially no $C_6$ olefin formation.

The foregoing example illustrates the fact that the process of producing $C_6$ olefins at high temperatures using the normally highly acidic silica-alumina catalysts is remarkably less advantageous than the process of the present invention.

*Example 9*

Example 8 is repeated except that the temperature is decreased to 550° F., the pressure is reduced to 0 p.s.i.g. and the amount of propylene added to the reactor is 440 parts per hour. There is obtained an 8% conversion of propylene with a 38% selectivity to dimer.

A comparison of Example 9 with Example 4 demonstrates that at approximately the same flow rate of propylene utilization of untreated silica-alumina catalyst results in undesirably lower selectivity even at low conversions, the selectivity to dimer having been reduced from 65% to 38% when using the untreated catalyst.

It will be realized that repetition of the foregoing examples utilizing in place of the "treated" catalysts there used weakly acidic zeolitic type clay catalysts gives results comparable to those set forth therein.

Generally, at higher pressures for a given flow rate the conversion of propylene will be increased. The pressures utilized may be broadly atmospheric up to several atmospheres, desirably 25 to 250 p.s.i.g. and preferably 50 to 75 p.s.i.g. The hourly space velocity is broadly 550 to 3300, desirably 700 to 950 and preferably 850.

The basic aqueous solution utilized to prepare the "treated" catalysts may comprise sodium carbonate containing from about 2 to 20% sodium carbonate or other equivalent basic media.

In addition to sodium carbonate, other alkali metal and alkaline earth metal hydroxides and carbonates can be employed to prepare the treated catalyst. It is usually desirable to treat the catalyst with solutions containing about 2 to 20% sodium carbonate, sodium hydroxide, potassium carbonate, potassium hydroxide, calcium carbonate, calcium hydroxide, and the carbonates and hydroxides of lithium, barium, and the like.

The results of Examples 1 to 9 are tabulated in Table 1 to facilitate comparison of conversion and selectivity at various operating conditions.

TABLE 1

| Example | Selectivity, percent | Conversion, percent | Temperature (° F.) | Pressure (p.s.i.g.) | Propylene Feed, Parts/Hr./100 Pts. Catalyst | Catalyst |
| --- | --- | --- | --- | --- | --- | --- |
| 1 | 95 | 3.5 | 850 | 50 | 930 | Treated silica-alumina. |
| 2 | 61 | 16 | 850 | 50 | 260 | Do. |
| 3 | 72 | 6 | 850 | 50 | 600 | Do. |
| 4 | 65 | 8 | 850 | 50 | 430 | Do. |
| 5 | 65 | 6 | 700 | 50 | 390 | Do. |
| 6 | 57 | 15 | 850 | 15 | 84 | Do. |
| 7 | 60 | 16 | 850 | 75 | 330 | Do. |
| 8 | | | 850 | 50 | 440 | Untreated silica-alumina. |
| 9 | 38 | 8 | 550 | 0 | 440 | Do. |

Table 1 illustrates the fact that at high flow rates the conversion of propylene is decreased with a corresponding increase in selectivity to dimer at a fixed reaction temperature. The reaction temperature is broadly in the range of from about 550 to 1000° F., desirably 700 to 950° F. and preferably 850° F. As the temperature is increased in this range, the selectivity to dimer increases.

Referring to the drawing, there is illustrated the relationship at two temperatures of dimer selectivity as related to percent conversion for propylene vapor phase dimerization according to the present invention. The relationship at 700° F. is shown by the solid line curve and the broken line curve shows the relationship at 850° F.

The drawing illustrates the feature of the present invention that at higher temperatures selectivity is increased at a given conversion. Thus, for example, at a conversion of 5% at 850° F. there is obtained a selectivity of 77% as compared to a selectivity of 65% obtained at 700° F. This, without undue cracking or production of higher polymers.

In view of the foregoing disclosures, variations and modifications will be apparent to one skilled in the art, and it is intended to include within the invention all such variations and modifications except that which does not come within the scope of the appended claims.

What is claimed is:

1. A process for the selective preparation of propylene dimer which comprises contacting a feed containing propylene as sole reactant in the vapor phase at a temperature in the range of approximately 550 to 1000° F., at superatmospheric pressure with a catalyst consisting essentially of silica-alumina, which catalyst was prepared by contact with aqueous sodium carbonate solution and washing until the washings were neutral, at an hourly space velocity in the range of 550 to 3300.

2. The process of claim 1 wherein the temperature is in the range of from 700 to 950° F., the pressure is in the range from about 25 to 250 p.s.i.g., and the hourly space velocity is in the range of from about 700 to 950.

3. The process of claim 1 wherein the temperature is 850° F., the pressure is in the range of from about 50 to 75 p.s.i.g., and the hourly space velocity is about 850.

4. A process for the selective preparation of propylene dimer which comprises contacting a feed containing propylene as sole reactant in the vapor phase at a temperature in the range of approximately 550 to 1000° F. at superatmospheric pressure with a catalyst consisting essentially of silica-alumina, which catalyst was prepared by contact with an aqueous solution of a compound selected from the group consisting of alkali metal hydroxides and carbonates, and washing until the washings were neutral at an hourly space velocity in the range of approximately 550 to 3300.

References Cited by the Examiner

UNITED STATES PATENTS

| | | | |
|---|---|---|---|
| 2,480,627 | 8/1949 | Bodkin et al. | 252—455 X |
| 2,658,924 | 11/1953 | Lukasiewicz et al. | 252—455 X |
| 2,779,742 | 1/1957 | Emmett | 252—455 |
| 2,881,233 | 4/1959 | Clark | 260—683.15 |
| 3,047,644 | 7/1962 | Winnick | 260—683.15 |
| 3,086,066 | 4/1963 | Breiter et al. | 260—677 |
| 3,104,270 | 9/1963 | Mattox et al. | 260—683.15 |

PAUL M. COUGHLAN, JR., *Primary Examiner.*